United States Patent [19]
Praca

[11] 3,712,034
[45] Jan. 23, 1973

[54] CRUSHING ROLLS FOR HAY CONDITIONER

[75] Inventor: Casimir Praca, Wasquehal, France

[73] Assignee: International Harvester Company, Chicago, Ill.

[22] Filed: June 8, 1970

[21] Appl. No.: 48,819

Related U.S. Application Data

[63] Continuation of Ser. No. 646,852, June 19, 1967, abandoned.

[52] U.S. Cl. ................................. 56/1, 56/DIG. 1
[51] Int. Cl. ............................................. A01d 49/00
[58] Field of Search .......... 56/1, DIG. 1; 29/121, 122, 29/123, 124, 125; 130/5 J

[56] References Cited

UNITED STATES PATENTS

| | | | |
|---|---|---|---|
| 2,947,130 | 8/1960 | Everett | 56/DIG. 1 |
| 3,210,825 | 10/1965 | Johnston | 29/125 |
| 2,179,579 | 11/1939 | Morral et al. | 130/5 J |

*Primary Examiner*—Antonia F. Guida
*Attorney*—Floyd B. Harman

[57] ABSTRACT

A hay conditioner with rollers having intermediate portions of elastomer material and ribbed steel or plastic end portions, the diameters of which are less than and at most equal to the diameter of the intermediate portion of the respective roll and the axial lengths of which are at least equal to the width of the windrow boards.

4 Claims, 13 Drawing Figures

INVENTOR
Casimir Praca

By
John J. Kowalik
ATT'Y

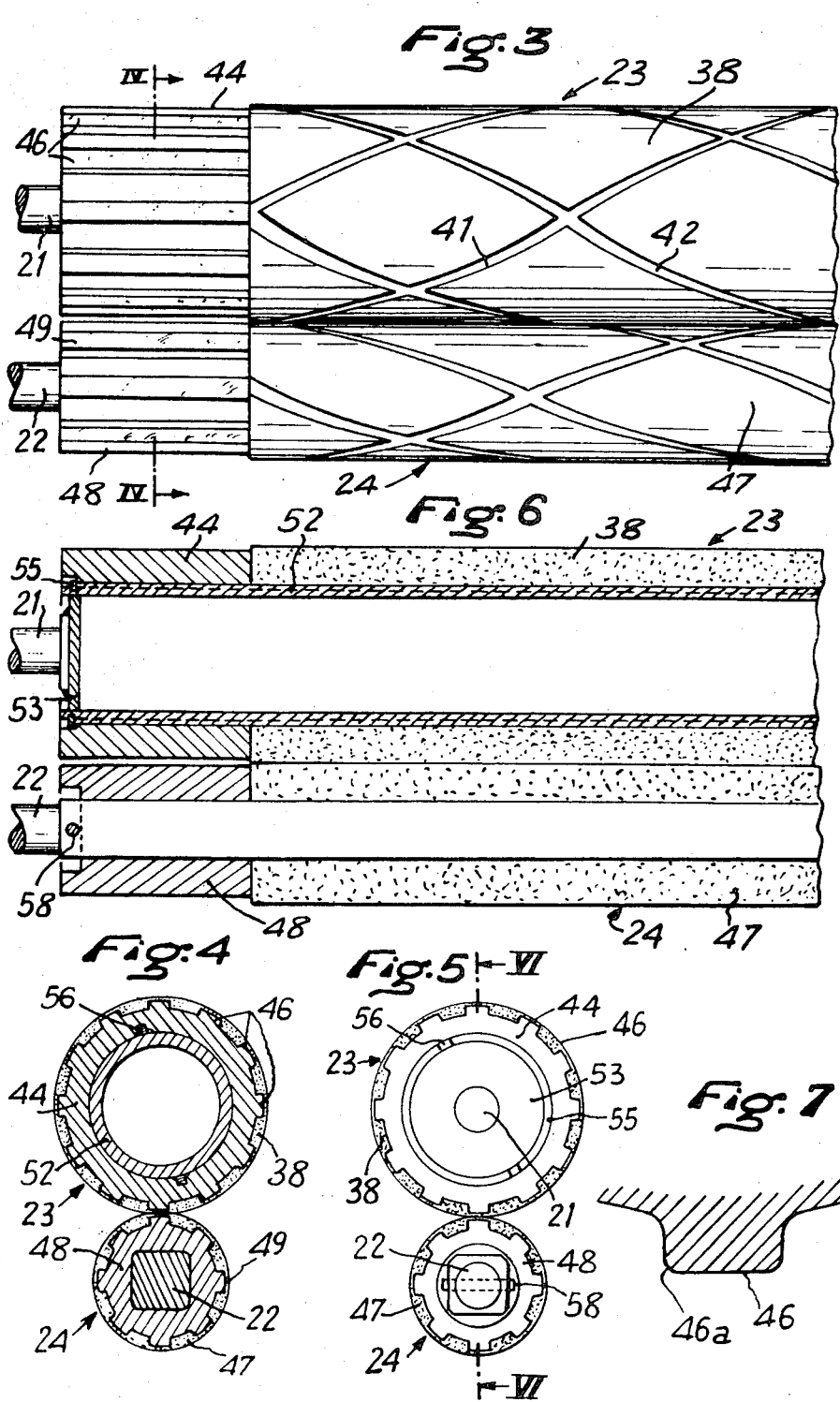

INVENTOR
Casimir Praca
By
John J. Kowalik
ATT'Y

CRUSHING ROLLS FOR HAY CONDITIONER

This is a continuation of my application Ser. No. 646,852 filed June 19, 1967, now abandoned.

This invention relates to hay conditioners of the type comprising two superposed horizontal crushing rolls which are driven in rotation in opposite directions, for example of the type described in French Pat. No. 1,237,408.

It is known that tractor-mounted mowers are often provided at each end with a windrow board which serves to move the new-mown hay to one side with a view to providing a free path for the tractor wheels. When a hay conditioner is placed directly behind a mower, the hay is not uniformly distributed for the essential purpose of "cracking" the hay stems inasmuch as the two windrow boards each thrust the hay aside, with the result that the central portion of the crushing rolls receives less material than the portions which are located at or near the ends. The hay therefore tends to build up at the ends of the crushing rolls whereas the material which is intended to pass through the central portion of the rolls is not compressed to a sufficient extent and the hay stems are therefore not sufficiently "cracked". In order to overcome this disadvantage, it has already been proposed to provide recessed elements on the end portions of one of the two rolls of the conditioner or raised elements on the ends of both rolls, the dimensions of said elements in the radial direction being greater than those of the raised elements and recesses of the central portion of said roll.

In the first of these two solutions which have already been proposed, the recessed elements are formed by longitudinal grooves having a width which progressively increases towards the ends of the roll in which they are formed, but this does not make it possible to absorb to a sufficient extent the material which is accumulated by the windrow boards, with the result that the rolls are caused to separate and the material which passes through the central portion is compressed only to a slight extent or may even not be compressed at all.

In the second solution proposed, the central portions of the two rolls are smooth and the ends thereof are finned. Consequently, the stems which pass through the center are cracked along their full length and retain their original shape and length whilst the stems which pass between the ends are broken up into short lengths. The hay is therefore either cracked or chopped and the drying time required by the hay which has passed through the central section is not the same as the drying time required by the hay which has passed through the end sections. When the hay is subsequently compressed in an agricultural baler, it is found that the bales are not evenly dried and that there is an appreciable loss of hay owing to the high proportion of very short stems.

The aim of this invention is to design a hay conditioner of the type referred to which is not subject to the above noted disadvantages of known systems.

To this end, and in accordance with the invention, each of the two opposite facing ends of the two rolls is provided with raised portions, preferably in the form of ribs, the external diameter of which is at a maximum equal to the diameter of the roll on which said raised portions are formed, the total volume of the recessed portions being substantially equal to, or slightly greater than, the total volume of the raised portions.

By virtue of this particular design, the hay stems crack along their full lengths and the drying time is uniform in the case of all stems. Furthermore, the additional material which is supplied by the windrow boards is capable of passing between the ends of the rolls by reason of the frequency of the numerous recesses formed in both rolls, and the pressure remains uniform between the rolls over the entire length of these latter.

The invention also has for its object forms of construction which comprise at least one of the following features:

a. The length of each roll end corresponds to the width of material displaced by the windrow board.

b. The ribs formed on the roll ends are provided with rounded edges.

c. The circumferential width of the ribs is substantially equal to the circumferential width of the spaces between two ribs and, preferably, the pitch of said ribs on both rolls is substantially the same.

d. The ribs are rectilineal and extend along generatrices of the roll considered.

e. The ribs are continuous over the roll end considered.

f. The ribs are non-continuous over each roll end or in other words are formed of portions which are displaced in staggered relation from one rib to the other.

g. The ribs formed on the roll ends are of helical configuration.

h. The ribs formed on each roll end considered are of herringbone configuration.

i. The aforesaid ribs are formed in a series of projections of frusto-conical or frusto-pyramidal configuration.

j. The central portion of a roll which is located between the two aforesaid roll ends is formed of a resilient material such as natural or synthetic rubber.

k. The aforesaid roll ends are formed of non-deformable material such as metal or plastic, for example.

A better understanding of the invention will be obtained from a perusal of the following description and from a study of the accompanying drawings which show a few forms of construction of hay conditioners in accordance with the invention which are given solely by way of example and not in any limiting sense.

In these drawings:

FIG. 3 shows a portion of the hay-conditioner rolls alone, this view being taken on an even larger scale;

FIG. 4 is a sectional view along line IV—IV of FIG. 3;

FIG. 5 is a view looking on the end of the assembly of the two crushing rolls of FIG. 3;

FIG. 6 is a longitudinal sectional view along line VI—VI of FIG. 5;

FIG. 7 is a view on a very large scale showing the shape of one of the ribs or splines which is formed on the end portions of the crushing rolls;

Figure 2:
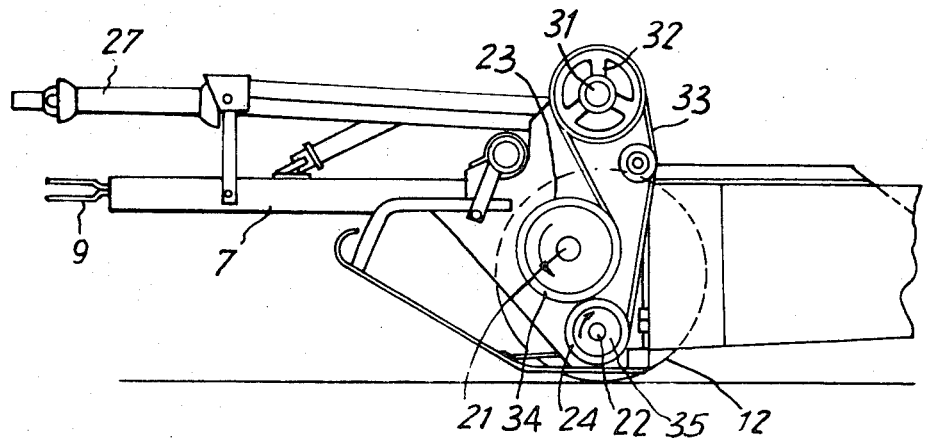
FIG. 2 is a sectional view along the line II—II of FIG. 1, this view being taken on a large scale.
Figure 1:
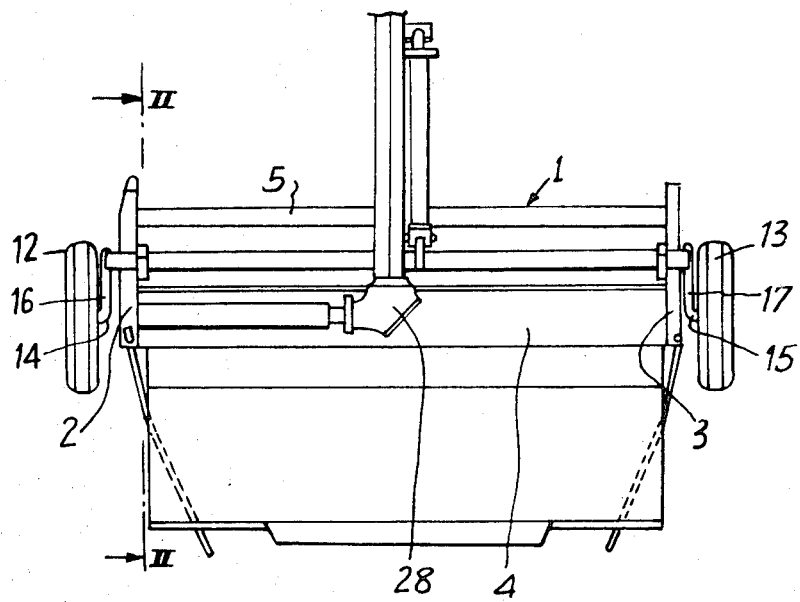
FIG. 1 is a diagrammatic plan view of a hay conditioner in accordance with the invention.

The hay conditioner which is illustrated in FIGS. 1 and 2 comprises a frame which is generally designated by the reference 1 and which is essentially made up of two vertical side panels 2, 3 of sheet metal, said side panels being interconnected by means of a cross beam and a spacer member 5 which is also beam 4 of sheet metal in the example. Said frame 1 is provided with a side-stringer 7 and means 9 for hitching to a tractor and is carried on two wheels 12, 13, the stub axles 14, 15 of which are mounted at the ends of two arms 16, 17 which are pivoted to the frame 1 about horizontal cross-shafts (which have not been shown in the drawings).

The two side panels 2, 3 carry the ends of two horizontal shafts 21, 22 (as also shown in FIG. 3) which carry two superposed rolls 23, 24 respectively. One of the two shafts referred to, for example the lower shaft 22, is journalled directly in the two panels whilst the other shaft 21 is supported by means of parts which are subjected to the action of springs (not shown) in order that the two rolls should be forcibly applied against each other.

The shafts 21, 22 are caused to rotate in opposite directions at a speed such that the two rolls carried thereon have the same peripheral speed and are driven from an input shaft 27, the front end of which can be coupled to a power take-off shaft carried by the tractor to which the hay conditioner is hitched. The input shaft 27 is coupled to the shafts 21 and 22 by means of a transmission system which comprises a bevel-gear drive housed in a casing 28, a horizontal cross-shaft 31, a pulley 32 which is keyed on said shaft, a driving belt 33 which is passed over the pulley 32 and two pulleys 34, 35 which are keyed respectively on the two shafts 21 and 22 and over which the driving belt 33 is also passed. The ratio of the diameters of the two pulleys 34 and 35 is equal to the ratio of the external diameters of the two rolls 23, 24.

Each of the two rolls which are generally designated by the reference numerals 23, 24 comprises a central portion, for example a portion 38 in the case of the cylinder 23, the length of which is approximately three-fourths of the total length of the roll. Said central portion is formed of resilient material such as, for example, rubber and is provided with crossed helical grooves 41, 42 of very long pitch.

The end portions of the two rolls, for example the portion 44 of the roll 23, are of non-deformable material and have good qualities of adhesion, even under moist working conditions. By way of example, the non-deformable material employed can be one of the following: cast iron, steel, alloys of non-ferrous metals, aluminum, plastic and so forth. In the example, said portion 44 is designed in the form of a cylindrical end having an external diameter which is slightly smaller than that of the central portion 38 of the roll. Said cylindrical end is provided with ribs or splines 46 (as also shown in FIGS. 4 and 5) and, between said ribs or splines, with grooves having a circumferential width which is substantially equal to, or slightly greater than, the circumferential width of said ribs.

Similarly, the roll 34 comprises a central portion 47 which is similar to the central portion 38 of the roll 23 and end portions such as the portion 48 which is similar to the end 44 of the roll 23. The ribs 49 of the end portion 48 of the roll 24 have the same peripheral width as that of the ribs 46 of the end portion 44 of the upper roll 23. The grooves have a circumferential width which is substantially equal to, or slightly greater than, the circumferential width of said ribs.

In the embodiment which is illustrated, the portion of the shaft which carries the upper roll 23 consists of a tube 52 (as shown in FIGS. 4 to 6), the two ends of which are fixed respectively on two end-shields such as 53 which are in turn welded to shaft-journals so as to form the component hereinabove designated as the shaft 21. The two roll ends such as 44 are engaged over the tube 52 and compress axially the resilient central portion 38 of the roll. Said two roll ends are each retained at the outer end by a flexible snap-ring 55 which is fitted in a corresponding annular groove of the extremity of the tube 52 and which is applied against an annular shoulder of the extremity of said roll end, Each roll end 44 is made fast for rotation with the tube 52 by means of a number of keys such as the key 56 which are fitted in corresponding longitudinal grooves formed in the bore of the roll end 44 and which are made integral with the tube 52, for example by welding.

In the embodiment which is illustrated, the shaft 22 of the lower roll 24 is provided in that portion thereof which carries the roll with a cross-section of square shape with rounded corners and the central portion 47 of the roll as well as the roll ends 48 are provided with holes of corresponding square cross-sectional configuration, thereby keying these components rotationally on the shaft 22. The two roll ends 48 are engaged over the square shaft 22, thus compressing axially the resilient central portion 47 of the rolls and are each retained axially at the outer end by means of a locking-pin 58.

During operation, when the hay conditioning machine is being drawn by the tractor over the windrows left by the mower, the two rolls 23, 24 rotate at high speed in the direction of the arrows (as shown in FIG. 2), one against the other, under a high pressure. The hay in the form of a swath or windrow which is spread along the ground is picked up by the two rolls and passed between these latter for the purpose of cracking the hay-stems, then finally discharged onto the ground behind the machine.

The most bulky masses of windrows which are located at the sides pass between the splined ends of the two rolls which provide a small clearance between them inasmuch as their external diameter is slightly smaller than that of the central portions of said rolls. The roll ends accordingly provide greater pick-up power than that of the central rubber portion, especially under the effect of moisture, and the splines of the roll ends afford an effective grip on the hay. The volume of hay is greater at the ends and the hay can therefore engage within the grooves as it passes between the ends of the rolls, thereby permitting of uniform pressure over the full length of the rolls.

As shown on a larger scale in FIG. 7, the edges of the ribs such as the rib 46 which are formed on the ends of both rolls are rounded as shown at 46a, thereby preventing the hay stems and leaves from being bruised.

Figure 8:
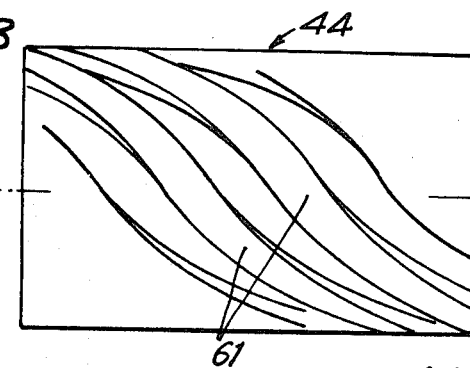
FIG. 8 is a view in elevation of a first alternative form of the end portion of one of the rolls.
Figure 9:
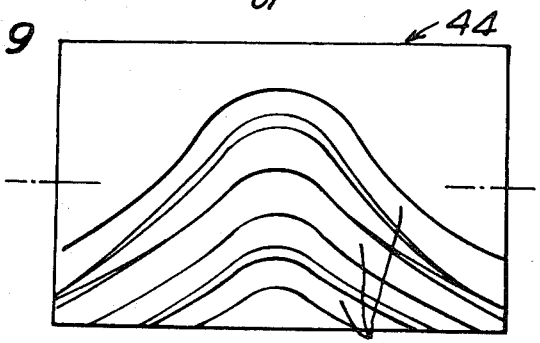
FIG. 9 is a view in elevation of a second alternative form of construction.

In the embodiment which is illustrated in FIG. 3, the ribs 46 of the roll ends are rectilineal and follow the direction of the generatrices of said roll ends. However, the roll-end ribs can be given any other suitable configuration which may be desired. Accordingly, there have also been illustrated different alternative forms such as helical ribs 61 (as shown in FIG. 8) or herringbone ribs (as shown in FIG. 9), the grooves between the ribs being preferably provided in addition with a width which is substantially equal to, or slightly greater than, the width of said ribs.

Figure 10:
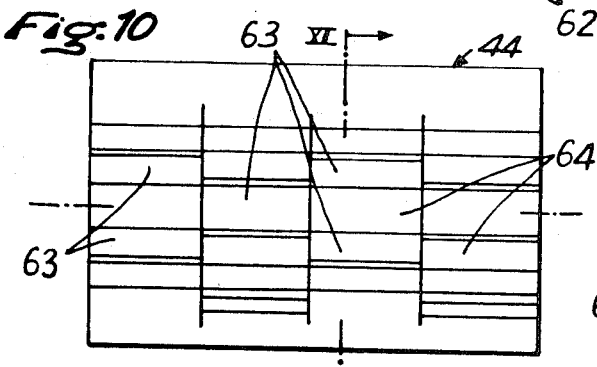
FIG. 10 shows a third alternative form of construction.
Figure 11:
FIG. 11 is a partial sectional view along line IX—IX of FIG. 10.
Figure 12:
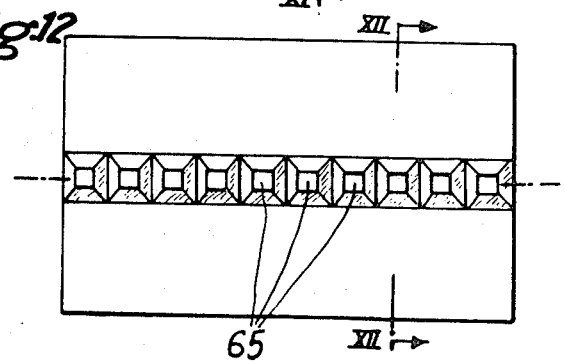
FIG. 12 illustrates a fourth alternative form of construction.
Figure 13:
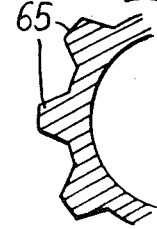
FIG. 13 is a partial sectional view along line XIII—XIII of FIG. 12.

In FIGS. 10 and 11, there are shown interrupted rectilineal longitudinal ribs, the elements 63 of which are disposed in staggered relation. In other words, the ribs are interrupted in a regular manner and alternate with the grooves 64 which are also preferably given the same width as the ribs. Finally, there is shown in FIGS. 12 and 13 another alternative form in which the raised portions are no longer constituted by ribs but by small aligned pyramid frustums 65 which therefore also form virtual interrupted ribs both in the longitudinal direction and in the circumferential direction. These frusto-pyramidal raised portions could also be replaced by raised portions of frusto-conical shape, or alternatively by recesses of corresponding shape.

Irrespective of the shapes of raised portions and recessed portions which may be adopted, they are preferably given configurations such that the total volume of the recessed portions is substantially equal to the total volume of the raised portions.

It will be readily understood that the invention is not limited to the forms of construction which have been described and illustrated and that modifications could be contemplated without thereby departing either from the scope or the spirit of the invention.

I claim:

1. In a hay conditioner of the type comprising two superposed horizontal crushing rolls adapted to receive hay therebetween and which are driven in rotation in opposite directions, the improvement comprising: said rolls each having an intermediate deformable body portion of elastomer material and opposite end portions formed of relatively non-deformable material, the corresponding end portions of the rolls cooperative with each other, each roll end portion being of lesser diameter than the intermediate portion, the corresponding end portions being spaced apart to provide a material receiving gap therebetween, whereby excess material is accommodated between the end portions without separating the rolls, the end portions have ribs and the circumferential width of the ribs is substantially equal to the circumferential width of the spaces between adjacent ribs and, the pitch of said ribs on both rolls being substantially the same.

2. In a hay conditioner of the type comprising two superposed horizontal crushing rolls adapted to receive hay therebetween and which are driven in rotation in opposite directions, the improvement comprising: said rolls each having an intermediate deformable body portion of elastomer material and opposite end portions formed of relatively non-deformable material, the corresponding end portions of the rolls cooperative with each other, each roll end portion being of lesser diameter than the intermediate portion, the corresponding end portions being spaced apart to provide a material receiving gap therebetween, whereby excess material is accommodated between the end portions without separating the rolls, the end portions comprise ribs and the ribs are rectilinear and extend along generatrices of the respective rolls.

3. In a hay conditioner of the type comprising two superposed horizontal crushing rolls adapted to receive hay therebetween and which are driven in rotation in opposite directions, the improvement comprising: said rolls each having an intermediate deformable body portion of elastomer material and opposite end portions formed of relatively non-deformable material, the corresponding end portions of the rolls cooperative with each other, each roll end portion being of lesser diameter than the intermediate portion, the corresponding end portions being spaced apart to provide a material receiving gap therebetween, whereby excess material is accommodated between the end portions without separating the rolls, the end portions comprise ribs and characterized in that the ribs are formed of portions displaced in staggered relation from one rib to the other.

4. In a hay conditioner of the type comprising two superposed horizontal crushing rolls adapted to receive hay therebetween and which are driven in rotation in opposite directions, the improvement comprising: said rolls each having an intermediate deformable body portion of elastomer material and opposite end portions formed of relatively non-deformable material, the corresponding end portions of the rolls cooperative with each other, each roll end portion being of lesser diameter than the intermediate portion, the corresponding end portions being spaced apart to provide a material receiving gap therebetween, whereby excess material is accommodated between the end portions without separating the rolls, ribs formed on the said end portions and said ribs are of helical configuration.

* * * * *